United States Patent
Chen et al.

(10) Patent No.: US 12,454,442 B2
(45) Date of Patent: Oct. 28, 2025

(54) METHOD FOR INSPECTING TWIST OF WIRE ROPES

(71) Applicant: Ming-Chu Chen, Taipei (TW)

(72) Inventors: Ming-Chu Chen, Taipei (TW); Ting-Chun Chen, Taipei (TW)

(73) Assignee: Ming-Chu Chen, Taipei (TW)

( * ) Notice: Subject to any disclaimer, the term of this patent is extended or adjusted under 35 U.S.C. 154(b) by 316 days.

(21) Appl. No.: 18/366,133

(22) Filed: Aug. 7, 2023

(65) Prior Publication Data

US 2024/0043244 A1 Feb. 8, 2024

(30) Foreign Application Priority Data

Aug. 8, 2022 (TW) .................................. 111129763

(51) Int. Cl.
*B66B 7/12* (2006.01)
*G06T 7/00* (2017.01)

(52) U.S. Cl.
CPC .......... *B66B 7/1238* (2013.01); *G06T 7/0002* (2013.01); *G06T 2207/30242* (2013.01)

(58) Field of Classification Search
CPC ............ G03H 2224/06; G06F 2119/08; G01N 2223/1066; G01N 2223/41; G01B 21/085; G01F 1/7084; G01M 3/002; G11B 6/60; B66B 7/1238; G06T 2207/30242
USPC ......................................................... 382/100
See application file for complete search history.

(56) References Cited

U.S. PATENT DOCUMENTS

| | | | | |
|---|---|---|---|---|
| 5,804,964 A | * | 9/1998 | Hamelin ................. | B66B 7/123 324/242 |
| 8,058,881 B2 | * | 11/2011 | Engbring ............... | G01R 31/58 324/529 |
| 2015/0285767 A1 | * | 10/2015 | Ouellette ............... | G01B 7/046 324/240 |
| 2022/0212894 A1 | * | 7/2022 | Ito .......................... | G01N 27/83 |

FOREIGN PATENT DOCUMENTS

WO    WO-2021152939 A  *  8/2021  ............. G01N 27/82

\* cited by examiner

*Primary Examiner* — Sheela C Chawan
(74) *Attorney, Agent, or Firm* — Burris Law, PLLC

(57) ABSTRACT

A method for inspecting twist of wire ropes is provided. The wire ropes support an elevator car, and each of the wire ropes includes a plurality of strands. The method is to be implemented by a processor and includes steps of: obtaining, for each of the wire ropes during movement of the elevator car, a number of strand segments that are present within a predetermined length of the wire rope; and comparing the numbers of strand segments that are obtained respectively for the wire ropes for analyzing the twist of the wire ropes, wherein the wire ropes are determined as having equal extent of twist when it is determined that the numbers of strand segments are identical, and the wire ropes are determined as having distinct extent of twist when it is determined that the numbers of strand segments are different from each other.

6 Claims, 4 Drawing Sheets

METHOD FOR INSPECTING TWIST OF WIRE ROPES

CROSS-REFERENCE TO RELATED APPLICATION

This application claims priority to Taiwanese Invention Patent Application No. 111129763, filed on Aug. 8, 2022.

FIELD

The disclosure relates to a method for inspecting wire ropes, and more particularly to a method for inspecting twist of wire ropes.

BACKGROUND

An elevator requires a plurality of wire ropes to support the weight of the elevator car. The wire ropes hang over and are driven by a traction wheel for moving the elevator car up and down. However, having uneven tensions in the wire ropes or having different extent of twist between the wire ropes may result in uneven degrees of wear respectively between the wire ropes and corresponding grooves on the traction wheel, which may cause the elevator to vibrate, or may cause the wire ropes to break, posing safety concerns for using the elevator.

Moreover, when the wire ropes have different extent of twist, the wire ropes may have distinct rigidity because lengths, diameters and/or elastic moduli of the wire ropes may vary, which may result in inaccurate tensions measurements of the wire ropes.

SUMMARY

Therefore, an object of the disclosure is to provide a method for inspecting twist of wire ropes that can alleviate at least one of the drawbacks of the prior art.

According to the disclosure, a method for inspecting twist of wire ropes is provided. The wire ropes support an elevator car, and each of the wire ropes includes a plurality of strands. The method is to be implemented by a processor and includes steps of: obtaining, for each of the wire ropes during movement of the elevator car, a number of strand segments that are present within a predetermined length of the wire rope; and comparing the numbers of strand segments that are obtained respectively for the wire ropes for analyzing the twist of the wire ropes, wherein the wire ropes are determined as having equal extent of twist when it is determined that the numbers of strand segments are identical, and the wire ropes are determined as having distinct extent of twist when it is determined that the numbers of strand segments are not identical.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
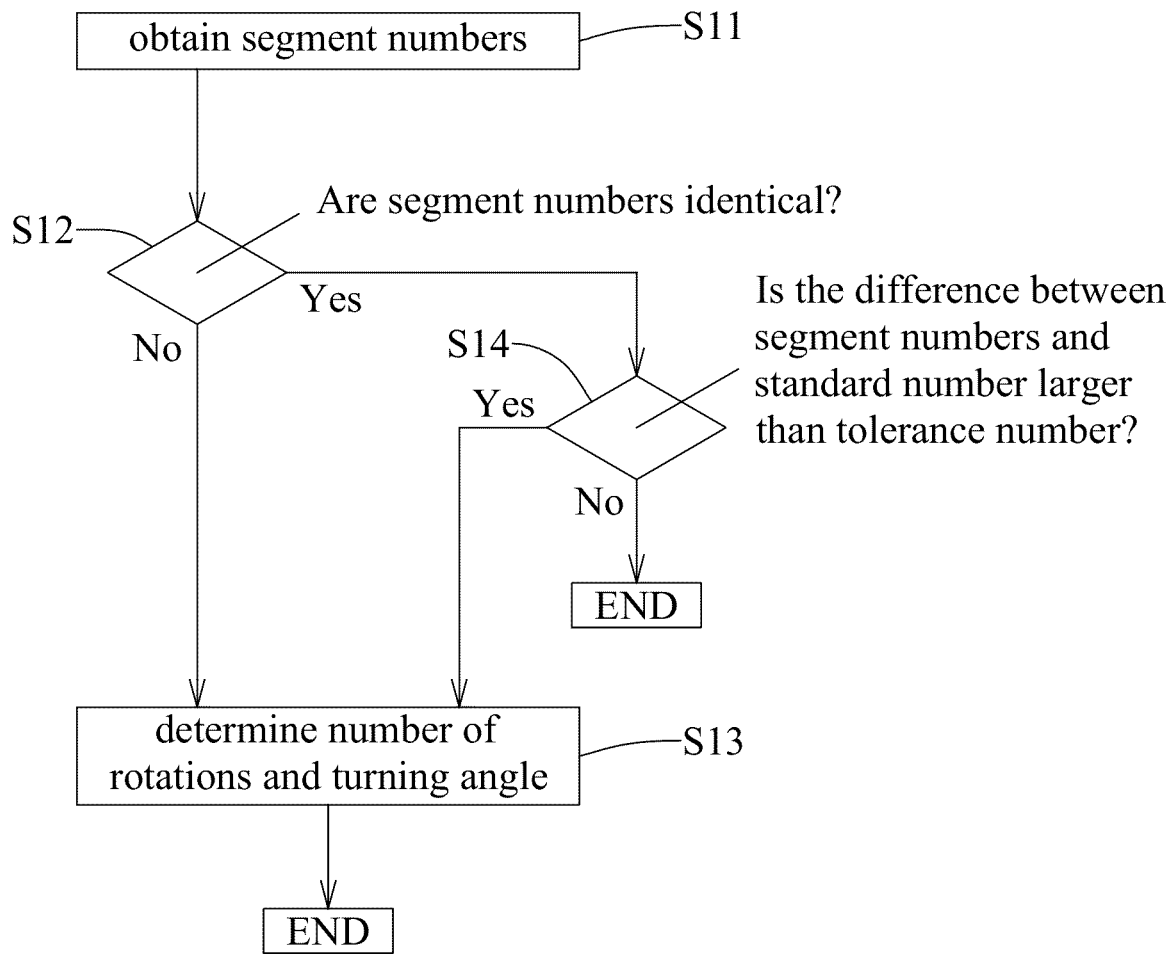
FIG. 1 is a flow chart illustrating a method for inspecting twist of wire ropes according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
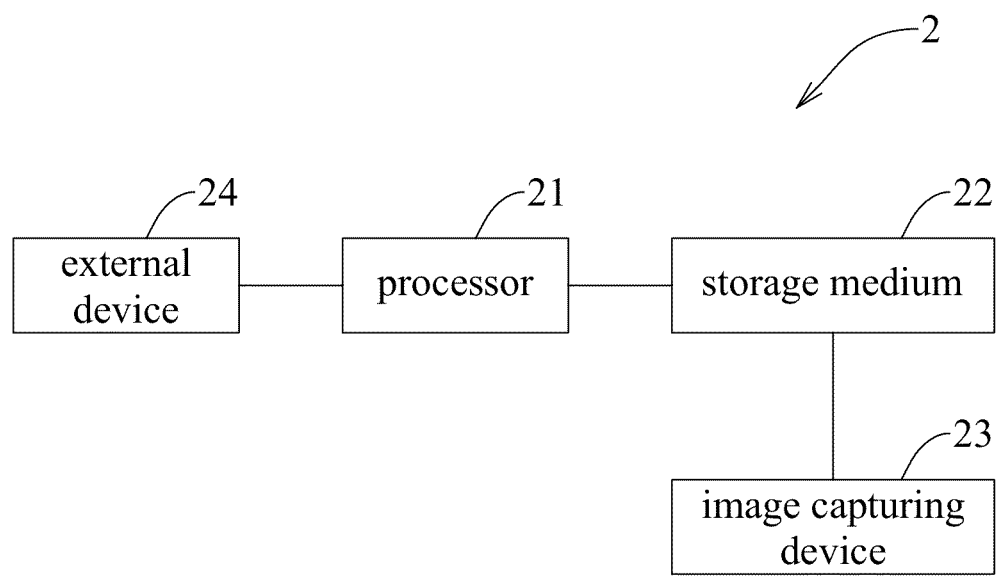
FIG. 2 is a block diagram illustrating a system for implementing the method for inspecting twist of wire ropes according to an embodiment of the disclosure.

Referring to FIGS. 1 and 2, a method for inspecting twist of wire ropes is to be implemented by a system 2 according to an embodiment of the disclosure. The system 2 includes a storage medium 22, an image capturing device 23, and a processor 21 that is electrically connected to the storage medium 22 and the image capturing device 23. The processor 21 may be, but is not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or a system on a chip (SoC), etc. The storage medium 22 may be embodied using computer-readable storage mediums such as hard disk drive(s), random access memory (RAM), read only memory (ROM), programmable ROM (PROM), and/or flash memory, etc. The image capturing device 23 may be a digital camera, a video camera, and/or a monitoring camera, etc.

Figure 3:
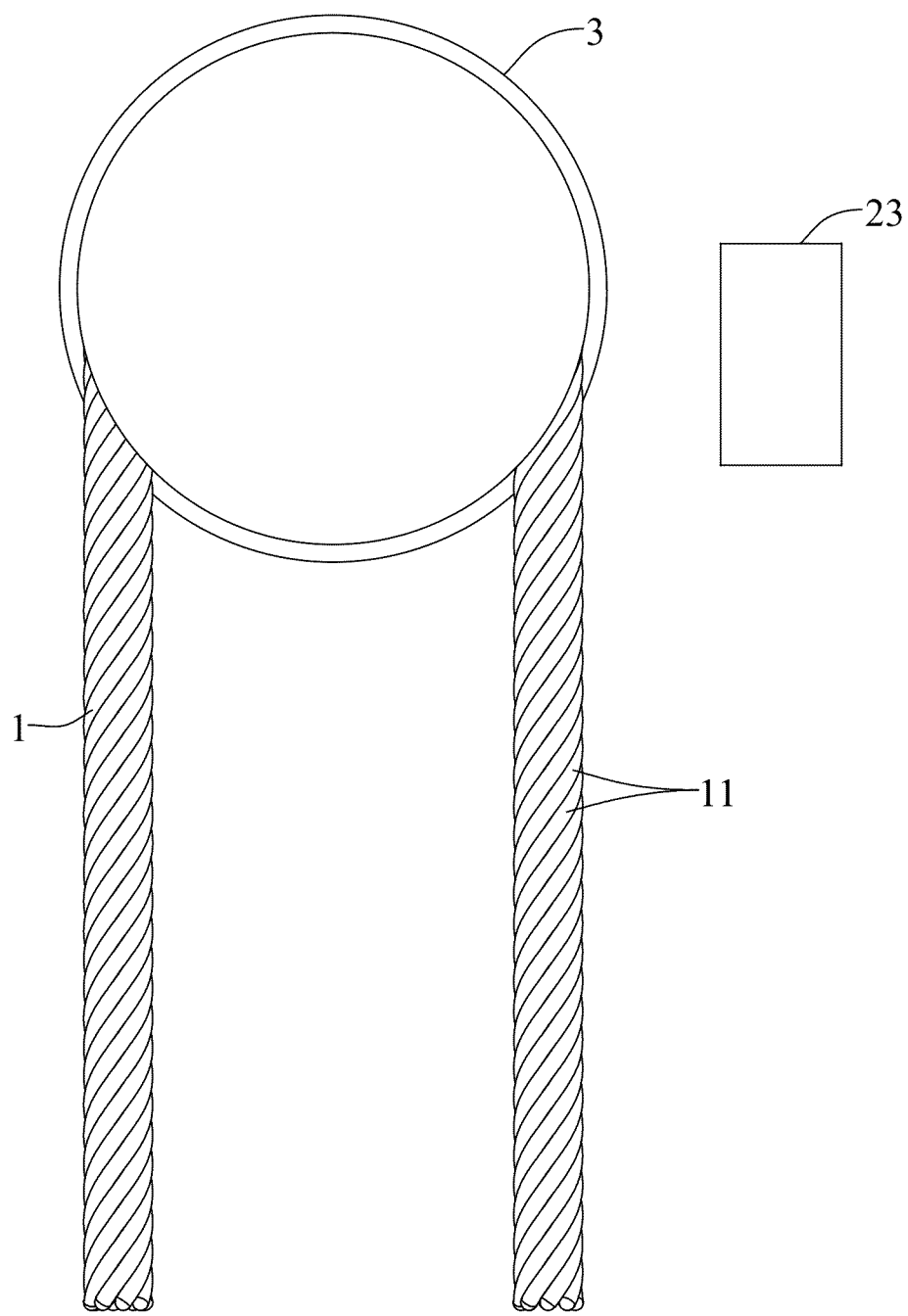
FIG. 3 is a schematic view illustrating a set-up of an image capturing device relative to a traction wheel according to an embodiment of the disclosure.
Figure 4:
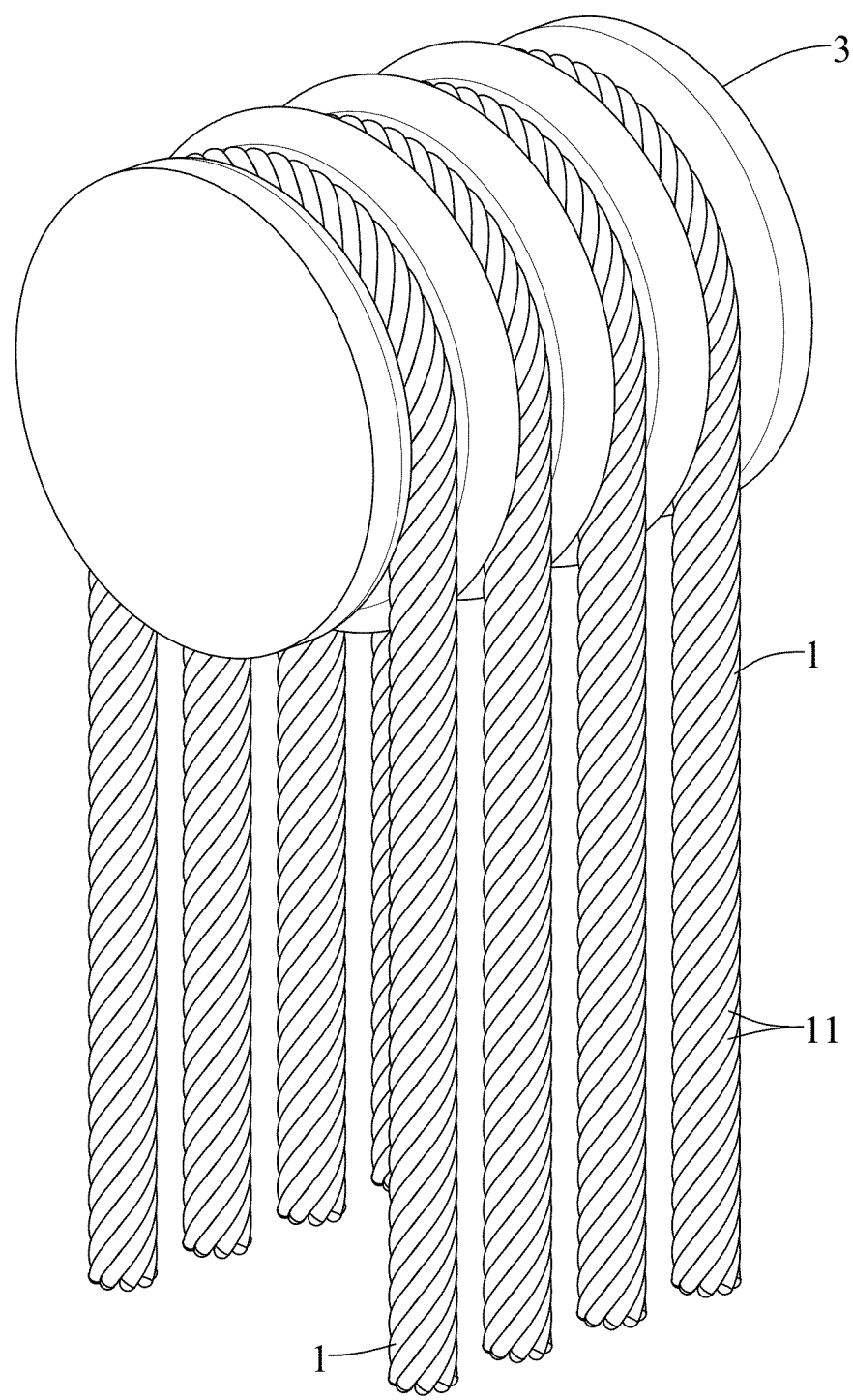
FIG. 4 is a schematic view illustrating a plurality of wire ropes hanging over a traction wheel according to an embodiment of the disclosure.

Further referring to FIGS. 3 and 4, the method is adapted to inspect the twist of the wire ropes 1 that are supporting an elevator car during movement of the elevator car, and each of the wire ropes 1 includes a plurality of strands 11. The wire ropes 1 hang over and are driven by a traction wheel 3 for moving the elevator car up and down. In this embodiment, four wire ropes 1 are used for explaining the method, and each of the wire ropes 1 includes eight strands 11. It should be noted that the number of wire ropes 1 and the number of strands 11 are not limited to the abovementioned example.

The method for inspecting twist of wire ropes includes steps S11 to S14 according to one embodiment of the disclosure.

In step S11, the processor 21 obtains, for each of the wire ropes 1 during movement of the elevator car, a number of strand segments (hereinafter referred to as "segment number") that are present within a predetermined length of the wire rope 1. Each of the strand segments is a portion of one of the strands 11 that is represented as a diagonal stripe viewing from one side of the wire ropes 1 as shown in FIG. 3. In this embodiment, the predetermined length is equal to a travel distance of the wire ropes 1 when moving the elevator car between a highest level and a lowest level. In some embodiments, the predetermined length may be a portion of the travel distance of the wire ropes 1.

To describe in further detail, the image capturing device 23 first obtains image data that records a sequence of images (e.g., a video) of the predetermined length of the wire ropes 1 during the movement of the elevator car, and the processor 21 may then determine the segment number for each of the wire ropes 1 based on the image data obtained by the image capturing device 23.

The image capturing device 23 may be disposed at a position relative to the traction wheel 3 as shown in FIG. 3. To describe in further detail, the image capturing device 23 may be disposed at a position with a horizontal level that is slightly below the axis of the traction wheel 3, so as to capture images of straight portions (i.e., not bent by the traction wheel 3) of the wire ropes 1 as the image data.

In this embodiment, the image capturing device 23 may transmit the image data directly to the processor 21 through a wired connection or wireless technology (e.g., Wi-Fi or Bluetooth®) for real-time analysis. In some embodiments, the image capturing device 23 may store the image data in the storage medium 22, and the processor 21 may then read the image data that is stored in the storage medium 22 for analysis.

In this embodiment, the processor 21 determines the segment number for each of the wire ropes 1 based on the image data using image recognition technology (e.g., by setting a baseline transverse to the wire rope 1 in the sequence of images, and using Python OpenCV to count the number of diagonal stripes that have passed through the baseline). Various techniques may be adopted when using Python OpenCV to count a number of objects in an image. For example, after the image is loaded, operations of grayscaling, edge detection, thresholding, contour finding are sequentially performed on the image, and the number of contours thus found are counted to obtain the number of objects in the image. It is noted the approach to determine the segment number for each of the wire ropes 1 based on the image data is not limited to the disclosure herein. In one example, the processor 21 determines the segment number for each of the four wire ropes 1 to obtain four segment numbers respectively of the four wire ropes 1. In some embodiments, the processor 21 may determine the segment number for each of the wire ropes 1 using a counter that is created in advance using Python OpenCV based on, for example but not limited to, the aforementioned algorithm (i.e., grayscaling, edge detection, thresholding, contour finding, and counting the number of contours).

In step S12, the processor 21 compares the segment numbers that are obtained respectively for the wire ropes 1 for analyzing the twist of the wire ropes 1. In other words, the processor 21 determines whether the segment numbers of the respective wire ropes 1 are identical. When it is determined that the segment numbers of the respective wire ropes 1 are not identical, the wire ropes 1 are determined as having distinct extent of twist, and a flow of the method proceeds to step S13; otherwise, when it is determined that the segment numbers of the respective wire ropes 1 are identical, the wire ropes 1 are determined as having equal extent of twist, and the flow proceeds to step S14.

In step S13, the processor 21 determines, with respect to each of the wire ropes 1, a number of rotation and a turning angle for adjusting the wire rope 1. To describe in further detail, for each of the wire ropes 1, the number of rotations and the turning angle may be obtained by performing a calculation of subtracting a standard number of strand segments from the segment number that correspond to the wire rope 1 to result in a difference value, and dividing the difference value by a number of the strands 11 that are included in the wire rope 1 to obtain a first quotient. The number of rotation is determined as an integer part of the first quotient, and the turning angle is determined by multiplying the first two decimals of the first quotient by 360 degrees.

Afterward, the processor 21 transmits the number of rotations and the turning angle for adjusting the wire rope 1 that are determined with respect to each of the wire ropes 1 to an external device 24 via wired or wireless communications. In some embodiments, the external device may be a computer, a tablet or a smartphone which displays the number of rotations and the turning angle so as to allow a maintenance personnel to adjust the twist of the corresponding wire rope 1 accordingly. In some embodiments, each of the wire ropes 1 is attached to an adjustable end connector (not shown) that can be rotated by the maintenance personnel to adjust the twist of the wire rope 1. In some embodiments, an automatic adjustment scheme may be adopted where the external device includes a controller (e.g., a motor controller), and a motor that is coupled to the adjustable end connector to rotate the same. After receiving the number of rotations and the turning angle from the processor 21, the controller controls the motor to rotate the adjustable end connector based on the number of rotations and the turning angle so as to adjust the twist of the corresponding wire rope 1.

In this embodiment, each of the wire ropes 1 includes eight strands 11. Assuming that the segment number of one of the wire ropes 1 is equal to 1150, and assuming that the standard number of strand segments is equal to 1128, then the first quotient of the one of the wire ropes 1 is obtained as an expression, (1150−1128)/8, which is equal to 2.75. Since the first quotient is equal to 2.75, the number of rotations is determined as two (i.e., the integer part of 2.75), and the turning angle is determined as 0.75*360 degrees (i.e., multiplying the first two decimals of 2.75 by 360 degrees), which is equal to 270 degrees. Thus, the one of the wire ropes 1 is to be adjusted by rotating two times, and an additional rotation of 270 degrees.

It should be noted that the standard number of strand segments is obtained by dividing the predetermined length of the wire rope 1 by a preset strand pitch to result in a second quotient, and then multiplying the second quotient by the number of the strands 11 that are included in the wire rope 1. The standard number of strand segments indicates how many strand segments should be present within the predetermined length of the wire rope 1 that has the extent of twist complying with standards, and the preset strand pitch may be provided by the elevator manufacturer or a manufacturer of the wire rope 1.

When it is determined in step S12 that the segment numbers of the respective wire ropes 1 are identical, the flow proceeds to step S14, where the processor 21 determines whether a difference between the segment numbers, which are identical, and the standard number of strand segments is larger than a tolerance number. If the determination is negative, the flow of the method ends; otherwise, the extent of twist of the wire ropes 1 are considered as abnormal, and the flow goes to S13, in which the processor 21 determines, with respect to each of the wire ropes 1, the number of rotation and the turning angle for adjusting the wire rope 1.

In this embodiment, a permissible deviation range in terms of twist for each of the wire ropes 1 is five rotations per 100 meters. Assuming that the predetermined length is equal to L meters, and assuming that each wire ropes 1 includes Y strands 11, the tolerance number may then be obtained based on expression, (L/100)*5*Y.

After adjusting each of the wire ropes 1 using the number of rotation and the turning angle that are obtained for a respective one of the wire ropes 1 in step S13, the extent of twist of the wire ropes 1 would become substantially identical and are within a normal range, facilitating a following process of adjusting tensions of the wire ropes 1. The wire ropes 1 may be adjusted periodically using the method for inspecting twist of wire ropes, which may reduce self-spinning of the wire ropes 1. Moreover, the predetermined length of the wire ropes 1 to be inspected may be equal to the travel distance of the wire ropes 1 when moving the elevator car between the highest level and the lowest level, so the wire ropes 1 may be inspected more comprehensively.

In summary, according to the method of the disclosure, the processor 21 is configured to obtain the segment numbers respectively of the wire ropes 1 based on the image data obtained by the image capturing device 23, and to determine, with respect to each of the wire ropes 1, the number of rotation and the turning angle for adjusting the wire rope 1. Using the image capturing device 23 allows a longer section of the wire ropes 1 to be easily inspected compared to inspections done manually. The segment numbers may be obtained conveniently and efficiently using the image capturing device 23 and the processor 21 with the image recognition technology, and the method allows the wire ropes to be properly adjusted so that the wire ropes have the same extent of twist, and thus have substantially the same rigidity.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for inspecting twist of wire ropes, the wire ropes supporting an elevator car, each of the wire ropes including a plurality of strands, the method to be implemented by a processor and comprising steps of:

obtaining, for each of the wire ropes during movement of the elevator car, a number of strand segments that are present within a predetermined length of the wire rope; and comparing the numbers of strand segments that are obtained respectively for the wire ropes for analyzing the twist of the wire ropes, wherein the wire ropes are determined as having equal extent of twist when it is determined that the numbers of strand segments are identical, and the wire ropes are determined as having distinct extent of twist when it is determined that the numbers of strand segments are not identical.

2. The method as claimed in claim 1, wherein the predetermined length is equal to a travel distance of the wire ropes when moving the elevator car between a highest level and a lowest level.

3. The method as claimed in claim 1, wherein the step of obtaining the number of strand segments includes obtaining image data that records a sequence of images of the predetermined length of the wire ropes during movement of the elevator car, and determining the number of the strand segments based on the image data using image recognition technology.

4. The method as claimed in claim 3, wherein the image data is obtained using an image capturing device that is disposed at a position relative to a traction wheel that drives the wire ropes to move.

5. The method as claimed in claim 1 further comprising a step of:

when it is determined that the numbers of strand segments of the respective wire ropes are not identical, determining, with respect to each of the wire ropes, a number of rotation and a turning angle for adjusting the wire rope, by performing a calculation of subtracting a standard number of strand segments from the number of strand segments that correspond to the wire rope to result in a difference value, and dividing the difference value by a number of the strands that are included in the wire rope to obtain a first quotient, taking an integer part of the first quotient as the number of rotation, and multiplying first two decimals of the first quotient by 360 degrees to obtain the turning angle, wherein the standard number of strand segments is obtained by dividing the predetermined length of the wire rope by a preset strand pitch to result in a second quotient, and multiplying the second quotient by the number of the strands that are included in the wire rope.

6. The method as claimed in claim 5 further comprising a step of:

when it is determined that the numbers of strand segments are identical, but a difference between the numbers of strand segments and the standard number of strand segments is larger than a tolerance number, repeating the step of determining, with respect to each of the wire ropes, a number of rotations and a turning angle for adjusting the wire rope.

\* \* \* \* \*